Figure 1:
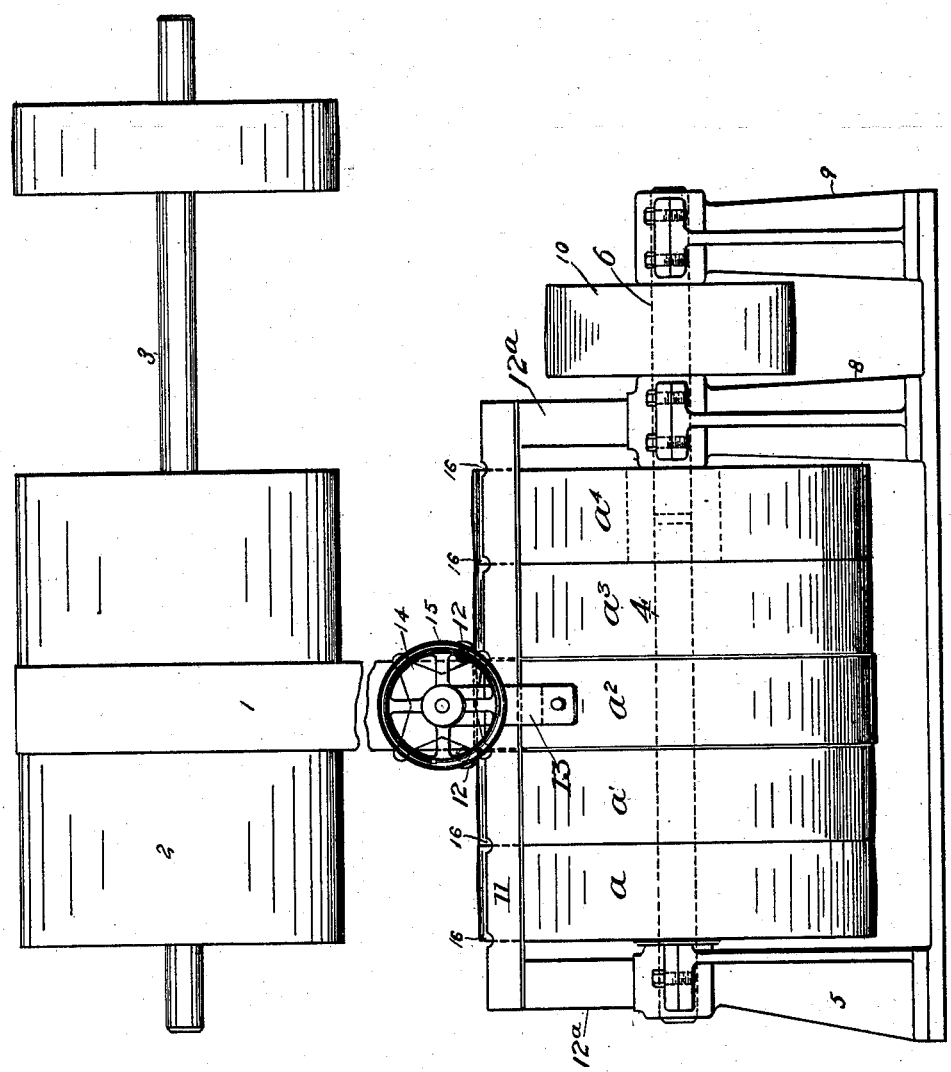

No. 654,681. Patented July 31, 1900.
C. E. SCRIMGEOUR.
DIFFERENTIAL PULLEY.
(Application filed Oct. 7, 1899.)

(No Model.) 3 Sheets—Sheet 1.

WITNESSES:
Charles J. Rathjen
Fred S. Semper.

INVENTOR
Chas. E. Scrimgeour,
BY
Gifford & Prell
ATTORNEYS

No. 654,681. Patented July 31, 1900.
C. E. SCRIMGEOUR.
DIFFERENTIAL PULLEY.
(Application filed Oct. 7, 1899.)
(No Model.) 3 Sheets—Sheet 2.
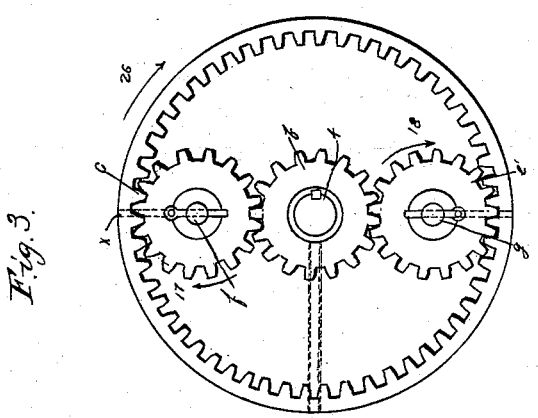
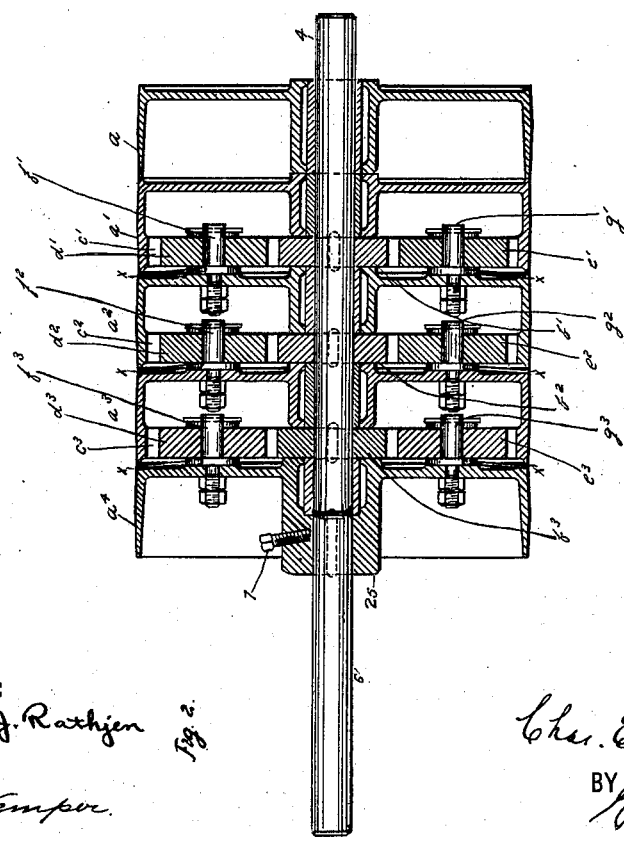
WITNESSES:
Charles J. Rathjen
Fred S. Kemper.
INVENTOR
Chas. E. Scrimgeour,
BY Gifford & Bull
ATTORNEYS
THE NORRIS PETERS CO., PHOTO-LITHO., WASHINGTON, D. C.

No. 654,681. Patented July 31, 1900.
C. E. SCRIMGEOUR.
DIFFERENTIAL PULLEY.
(Application filed Oct. 7, 1899.)
(No Model.) 3 Sheets—Sheet 3.
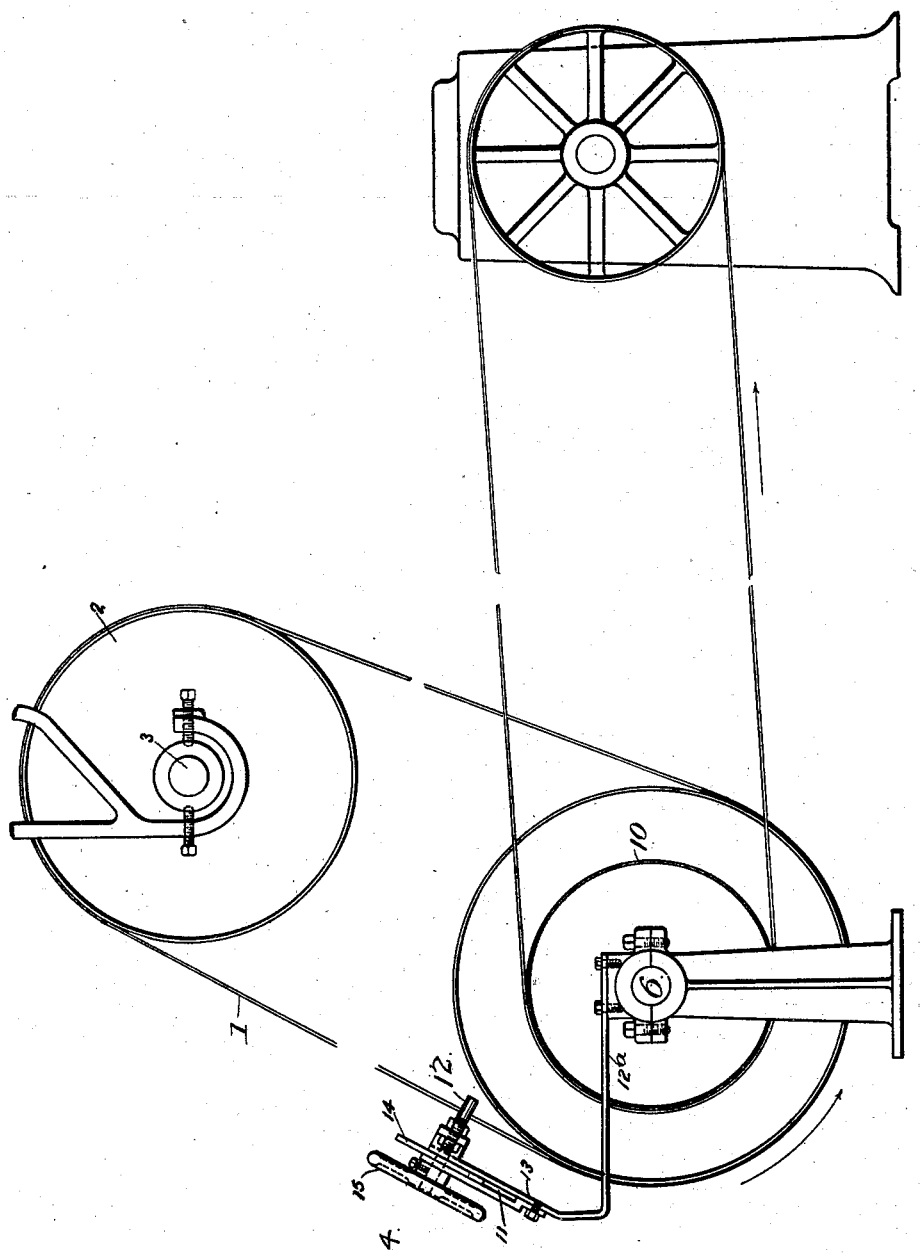
WITNESSES:
INVENTOR
ATTORNEYS

UNITED STATES PATENT OFFICE.

CHARLES E. SCRIMGEOUR, OF LEWISTON, MAINE, ASSIGNOR OF ONE-HALF TO WILBERFORCE B. HAMMOND, OF CAMBRIDGE, MASSACHUSETTS.

DIFFERENTIAL PULLEY.

SPECIFICATION forming part of Letters Patent No. 654,681, dated July 31, 1900.

Application filed October 7, 1899. Serial No. 732,895. (No model.)

*To all whom it may concern:*

Be it known that I, CHARLES E. SCRIMGEOUR, a citizen of the United States, and a resident of Lewiston, in the county of Androscoggin and State of Maine, have invented certain new and useful Improvements in Differential Pulleys, of which the following is a specification.

The object of my invention is to provide a differential pulley of such character that by simply shifting a belt laterally from one portion of it to another the speed transmitted may be varied within very wide limits.

In the accompanying drawings, Figure 1 represents my improved pulley combined with a belt, belt-shifter, and driving-drum. Fig. 2 represents a vertical longitudinal section of the pulley. Fig. 3 is an end view of one section of the pulley with a diagram of the three gears adjacent thereto. Fig. 4 is a detail of the belt-shifter.

1 is a belt leading from the driving-drum 2 on the counter-shaft 3 about the differential pulley to drive it.

4 is a shaft held from rotation in any suitable standard, as 5, and having keyed to it at intervals a series of gears $b'$ $b^2$ $b^3$. Rotatably mounted upon said shaft 4 are the pulley-sections $a$ $a'$ $a^2$ $a^3$ $a^4$.

$c'$ $c^2$ $c^3$ are internal gear-teeth on the pulley-sections $a'$, $a^2$, and $a^3$, respectively. The gears $d'$ and $e'$, rotatably mounted upon the studs $f'$ $g'$, fixed parallel with the shaft 4 on the pulley-section $a^2$, mesh with the gears $b'$ $c'$. The gears $d^2$ and $e^2$, rotatably mounted upon the studs $f^2$ $g^2$, fixed parallel with the shaft 4 to the pulley-section $a^3$, mesh with the gears $c^2$ $b^2$. The gears $d^3$ and $e^3$, rotatably mounted upon the studs $f^3$ $g^3$, fixed parallel with the shaft 4 to the pulley-section $a^4$, mesh with the gears $c^3$ $b^3$. The hub 25 of pulley-section $a^4$ extends beyond the end of the shaft 4 over the end of the driven shaft 6, to which the hub 25 is fixed by a set-screw 7 or other suitable means. The shaft 6 runs in suitable bearings on standards 8 and 9 and drives a pulley 10. The pulley-sections $a$ $a'$ $a^2$ $a^3$ $a^4$, being equal in diameter and placed contiguous with each other in axial alinement, form a practically-continuous cylindrical surface, parallel with which is placed the bar 11, which is supported upon arms $12^a$ and upon which is supported the belt-shifter 12 and its carriage. The bar 11 passes through the frame 13 of this carriage, and upon said frame is mounted a stepping-wheel 14, moved by the hand-wheel 15. 16 represents notches in the bar 11, spaced to correspond with the points of the stepping-wheel 14, so that by turning the hand-wheel 15 one-quarter of a revolution the stepping-wheel 14 will move the carriage, and with it the belt-shifter, the distance between two notches. This distance is also made to correspond with the width of the pulley-sections, so that for each one-quarter revolution of the hand-wheel 15 the belt 1 is shifted from one pulley-section to the next.

The operation is as follows: The belt 1 is driven at a constant speed by the pulley 2 and when upon the pulley-section $a$ turns this pulley-section and nothing more, because that pulley-section is loose upon the shaft 4 and is not geared to the adjacent pulley-section $a'$. If now the attendant without stopping the belt 1 turns the hand-wheel 15 one-quarter revolution, he shifts the belt 1 from the pulley-section $a$ to the pulley-section $a'$, which is immediately driven by the belt, and through its internal gear $c'$ compels the gears $d'$ and $e'$ to travel around the stationary gear $b'$ and carry with them their journal-pins $f'$ and $g'$, and consequently the pulley-section $a^2$, which in turn by a similar mode of operation drives the pulley-section $a^3$, which in turn by a similar mode of operation drives the pulley-section $a^4$, which drives the shaft 6. If the arrow 26 represents the direction in which the pulley-section $a'$ is driven, the arrows 17 and 18 will represent the direction in which the gears $d'$ and $e'$, respectively, are driven, and the arrow 26 will represent the direction in which the journal-pins $f'$ and $g'$, and consequently the pulley-sections $a^2$, $a^3$, and $a^4$, are carried. Thus it will be seen that all of the sections of the pulley move in the same direction, which is essential for coöperating with the same belt 1 and permitting such belt to be shifted from one pulley-section to another throughout the series without stopping the rotation. The speed, however, at which each pulley-section is driven will be less than the speed of the pulley-section preceding it in the series, so that when the belt is running on the pulley-section $a'$ there will be the maximum reduction in the speed communicated to the shaft 6. This speed reduction will be less as the belt 1 is shifted onto the succeeding members $a^2$ $a^3$ $a^4$ of the pulley-section series. When the belt reaches the pulley-section $a^4$, it will drive the shaft 6 without reduction of speed. When the belt is shifted onto the pulley-section $a^4$, the speed of the pulley-sections $a^3$, $a^2$, and $a'$ will be accelerated, so that it is obvious that the same mode of operation may be employed for either retarding or accelerating the speed.

I claim—

A pulley containing, in combination, a series of pulley-sections $a'$, $a^2$, &c., the peripheries of which form a substantially-continuous cylinder; a series of internal gears $c'$, $c^2$, &c., carried by said pulley-sections; a shaft upon which said pulley-sections revolve; a series of fixed gears $b'$, $b^2$, &c.; a series of planetary moving gears $d'$, $d^2$, &c., meshing with said internal gears and fixed gears, and a series of studs whereon said planetary moving gears rotate; the stud carrying the planetary moving gear which meshes with each pulley-section being fixed to the next pulley-section of the series; substantially as described.

CHARLES E. SCRIMGEOUR.

Witnesses:
 JEAN BRUYÈRE,
 A. L. HUBBARD.